United States Patent [19]
Rhelimi

[11] Patent Number: 6,049,790
[45] Date of Patent: Apr. 11, 2000

[54] PROTECTED KEYPAD APPARATUS

[75] Inventor: Alain Rhelimi, Cachan, France

[73] Assignee: Schlumberger Industries, Montrouge, France

[21] Appl. No.: 08/793,007

[22] PCT Filed: Aug. 8, 1995

[86] PCT No.: PCT/FR95/01061

§ 371 Date: Apr. 23, 1997

§ 102(e) Date: Apr. 23, 1997

[87] PCT Pub. No.: WO96/05548

PCT Pub. Date: Feb. 22, 1996

[30] Foreign Application Priority Data

Aug. 17, 1994 [FR] France ................................. 94 10076

[51] Int. Cl.[7] ........................... G06F 1/00; H03M 11/00; H03K 17/96
[52] U.S. Cl. .............................. 705/73; 713/183; 341/22; 345/173; 380/52
[58] Field of Search .................. 380/23, 52; 341/22, 341/34; 345/173; 705/73; 713/183

[56] References Cited

U.S. PATENT DOCUMENTS

| | | | |
|---|---|---|---|
| 4,333,090 | 6/1982 | Hirsch | 380/52 |
| 4,593,384 | 6/1986 | Kleijne | 365/228 |
| 4,926,173 | 5/1990 | Frielink | 341/22 |
| 4,962,530 | 10/1990 | Cairns | 380/23 |
| 5,025,255 | 6/1991 | Mould | 341/26 |
| 5,406,630 | 4/1995 | Piosenka et al. | 380/52 |

FOREIGN PATENT DOCUMENTS

| | | | |
|---|---|---|---|
| 0246712 | 12/1987 | European Pat. Off. | G07F 7/10 |
| 0573719 | 12/1993 | European Pat. Off. | H03M 11/00 |
| 2693815 | 1/1994 | France | G06K 19/073 |
| 4126760 | 3/1992 | Germany | G09C 5/00 |
| 2223115 | 3/1990 | United Kingdom | H03M 11/00 |

*Primary Examiner*—Gilberto Barron, Jr.
*Attorney, Agent, or Firm*—Frishauf, Holtz, Goodman, Langer & Chick, P.C.

[57] ABSTRACT

The invention relates to protected keypad apparatus, in particular for machines actuated by insertion of an electronic smart card. The keypad proper (10) comprises n sensitive zones ($Z_i$), each sensitive zone being associated with a respective sensor and with an individual processing circuit ($14i$) that includes in particular an encryption function. The sensor and the circuit form a monolithic unit. The apparatus further includes a driver unit (18) connected to each circuit ($14i$) via a bus (16). The circuits periodically and cyclically transmit encrypted signals indicating activation or non-activation of the sensitive zones.

17 Claims, 3 Drawing Sheets

PROTECTED KEYPAD APPARATUS

The present invention relates to protected keypad apparatus for entering data into a machine.

More precisely, the invention relates to protected keypad apparatus for entering control data into a machine so as to control said machine, the apparatus making it possible to prevent attempts at fraud consisting in intercepting the data entered by means of the keypad.

In a very large number of systems, the data required for controlling machines is entered in particular via interface apparatus consisting of a keypad having mechanical keys or, more often, virtual keys, i.e. non-mechanical keys, the actuation of which is detected by a sensor, enabling the user to enter the control data.

When it is necessary to control access to operation of such machines, and in particular when access to such machines is controlled by inserting a data storage medium such as a card containing confidential data specific to the bearer, a user wishing to gain access to the machine must simultaneously enter the confidential data by means of the keypad. Clearly, to avoid fraud, it is necessary to incorporate means preventing a dishonest person from recording the type of the signals associated with the confidential data contained in the medium.

This situation occurs in particular in automatic teller machines or cash dispensers actuated by electronic smart cards or in electronic payment terminals enabling purchases to be made by means of an electronic smart card.

The simplest way of making fraudulent use of such a keypad is to connect the keypad matrix to an eavesdropping matrix enabling the signals to be tapped and recorded. Another way is to tap the keyboard decoding signals and to deduce the active key therefrom.

A solution has been proposed for solving this problem. It consists in preventing access to the any of the electronic circuits associated with the keypad. That "physical protection" technique consists in enclosing all of the electronic components and all of the mechanical components of the keypad in a tamperproof enclosure. Surveillance of access to this tamperproof enclosure is performed by numerous intrusion sensors.

When an intrusion is detected, a procedure is triggered for destroying at least that portion of the circuits which contains secret data.

It can be understood that such a solution, and in particular installing sensors enabling any attempted intrusion to be detected, is very expensive and it gives rise to additional costs incurred in bringing the system back into operation.

An object of the present invention is to provide protected keypad apparatus that is effective in preventing any of the above-mentioned attempts at fraud or break-in, while having implementation cost that is limited or at least compatible with the cost of the overall installation.

To achieve this object, the protected keypad apparatus for entering data into a machine, said keypad including n sensitive zones, a detection sensor associated with each sensitive zone for detecting actuation of the associated sensitive zone, and a keypad driver unit for driving said keypad, is characterized in that it further includes:

n individual processing circuits (14i), and n sensors (24), each circuit being associated with a sensor, each unit comprised by an individual processing circuit and its associated sensor having a physically monolithic structure forming a protected key, each circuit being associated with a respective sensitive zone and including encryption means (22, 26, 28, 30) for encrypting detection or non-detection of activation of the associated sensitive zone; and electrical link means for conveying data between said keypad driver unit and each of said individual processing circuits;

said driver unit and said individual circuits including means for periodically causing encrypted data indicating activation or non-activation of each of said sensitive zones to be conveyed to the driver unit.

In other words, the protected keypad apparatus for entering data into a machine is composed of n protected keys. Each protected key, which is physically monolithic, is constituted by:

a processing circuit;

a sensor (detection sensitive zone); and communications means.

Each processing circuit makes it possible to encrypt the key activation or key non-activation data supplied by the sensor, the encrypted data is then conveyed cyclically from the protected key to the driver unit via the communications means.

It can be understood that such provisions solve the problem posed effectively. Firstly the protected key is monolithic, i.e. it is implemented in a single (semiconductor) integrated circuit which therefore cannot be physically disassembled without being destroyed. It is physically impossible to tap a detection signal related to activation of the key. Furthermore, as regards the electrical link means between the various individual processing circuits and the keypad driver unit, tapping signals in transit provides no useable data since each individual processing circuit transmits a respective signal and since the signals are encrypted.

In various preferred embodiments of the invention, the sensors associated with the sensitive zones are preferably capacitive sensors, or optionally opto-electronic detectors, or else electromagnetic detectors of the damped oscillating circuit type. In all cases, the detection component is implemented directly on the semiconductor chip in which the various components of the electronic processing circuit are implemented.

Other characteristics and advantages of the present invention appear more clearly on reading the following description of some embodiments of the invention given by way of non-limiting example and with reference to the accompanying drawings, in which.

Figure 1:
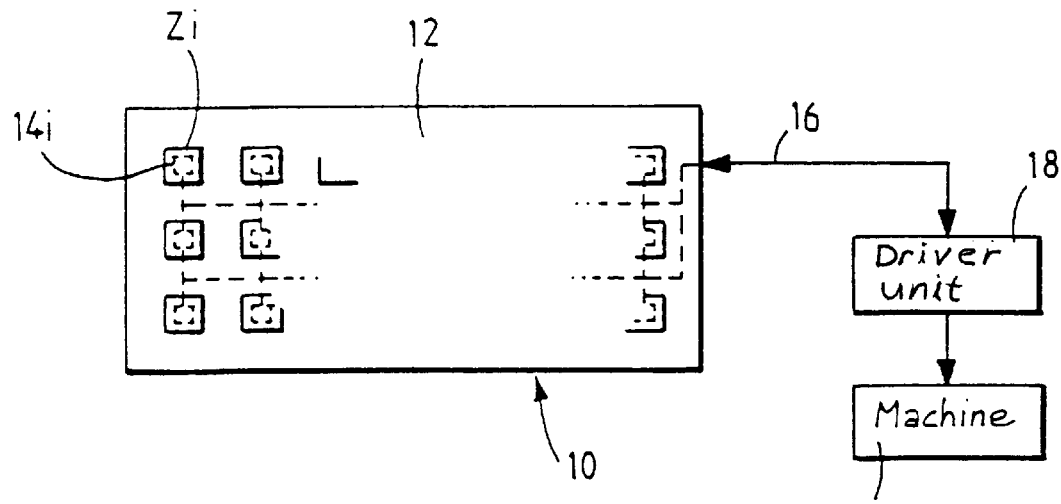
FIG. 1 is an overall diagrammatic view of the protected keypad.

The protected keypad apparatus as a whole is described with reference to FIG. 1. The protected keypad apparatus includes a keypad proper 10 which, on its front face 12, is provided with a plurality of sensitive zones such as Zi, each sensitive zone being associated with an item or a piece of data to be entered. In the context of the present invention, each sensitive zone is associated with a sensor (not shown on FIG. 1) which makes it possible to detect whether or not the sensitive zone has been activated by means of a finger. The unit comprising the sensitive zone and its associated sensor thus constitutes a virtual key of the keypad which delivers an electrical signal in the event of activation, and no electrical signal from the sensitive zones that are not activated. In accordance with the invention, each virtual key Zi is associated with an individual processing circuit 14i which is shown diagrammatically in FIG. 1 and which is described in more detail below. The various processing circuits 14i are connected to a data-conveying bus 16, the bus 16 being itself connected to a keypad driver unit 18 which, in the context of the present invention has a particular structure as explained below. The keypad driver unit is connected to the machine proper 20 into which the keypad 10 makes it possible to enter control data.

Figure 2:
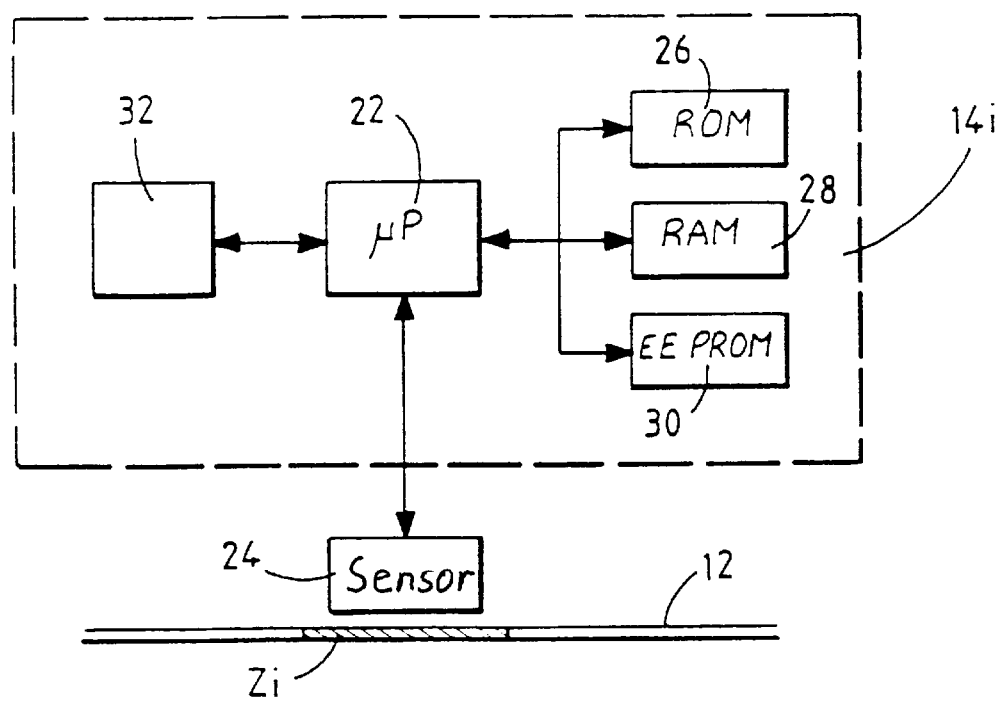
FIG. 2 is a block diagram showing the structure of the individual processing circuit.
Figure 3:
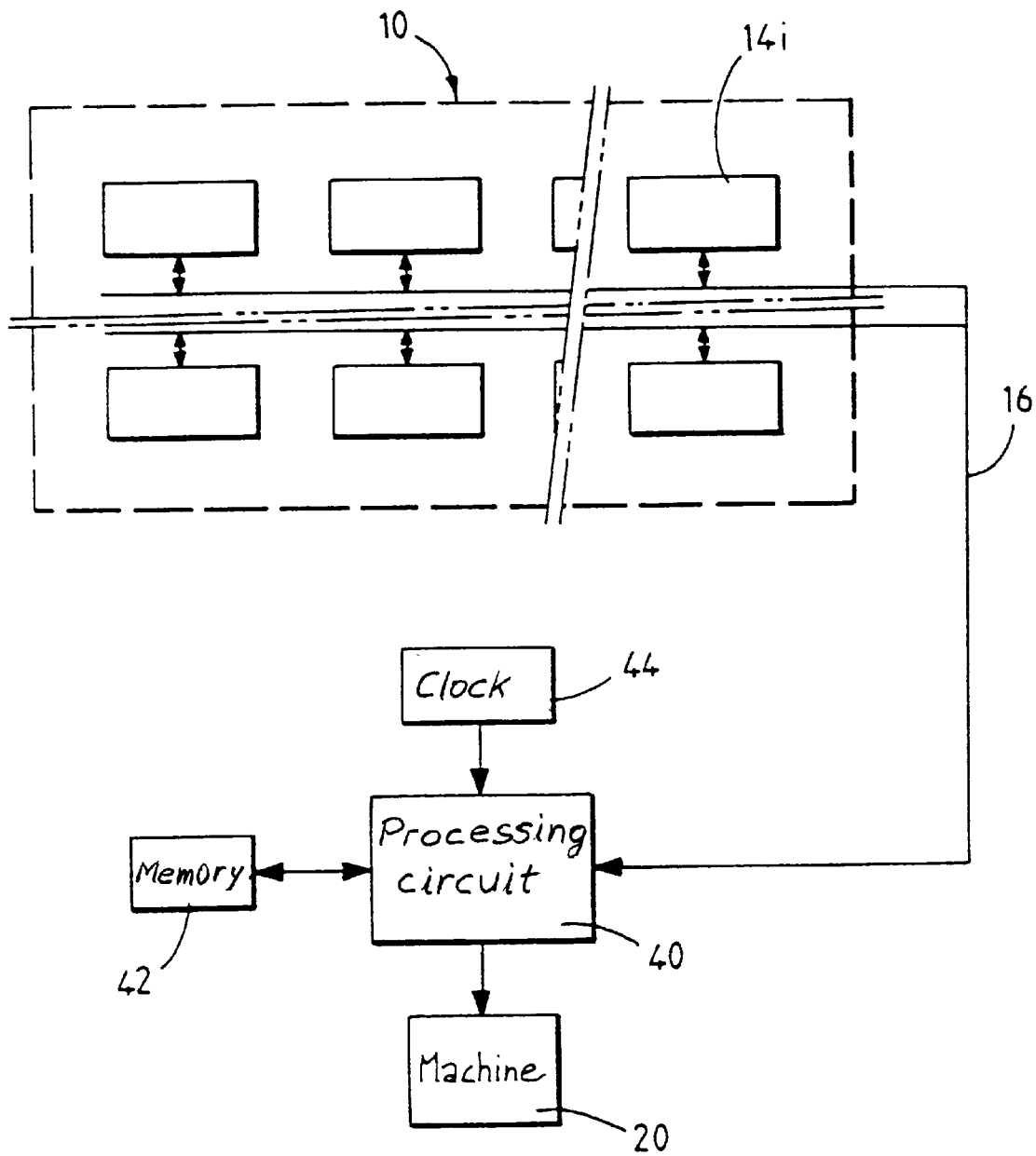
FIG. 3 is a simplified diagram showing how the protected keypad apparatus is organized.

FIG. 2 shows a preferred embodiment of an individual processing circuit 14i. It is organized around a microprocessor 22 which receives an activation signal or a non-activation signal from the sensor 24 associated with it. As shown in FIG. 2, the sensor 24 is disposed facing the sensitive zone Zi of the front face 12 of the keypad. In the individual processing circuit, the microprocessor is associated in conventional manner with a ROM 26, a RAM 28, and an EEPROM 30. The output from the microprocessor, or more precisely the encrypted data that it produces, can be conveyed over the bus 16 via the interface circuit 32.

The essential function of the circuit 14i is to produce encrypted data giving the activation or non-activation state of the sensor that is associated with it, and providing identification of the key with which it is associated. For this purpose, the ROM 26 contains software making it possible to implement an algorithm for encrypting data, which software is executed by the microprocessor 22. The EEPROM preferably contains a specific encryption key that is specific to the circuit 14i in question and data identifying the keypad key in question. The RAM enables the corresponding encrypted data to be stored temporarily, which data is to be conveyed via the interface circuit 32 over the bus 16 in response to an interrogation message coming from the driver unit 18, as explained below.

In accordance with the invention, the various individual processing circuits 14i are periodically and cyclically interrogated by the driver unit 18, and they respond by returning over the bus 16 the encrypted data corresponding to the identity of the key in question and to its activated or non-activated state. For this purpose, the driver circuit essentially comprises a transmission and processing circuit 40, a memory 42, and a clock 44. Periodically, the processing circuit 40 transmits a series of interrogation instructions over the bus 16 to each of the individual processing circuits 14i. The interrogation instants are defined by the time base 44. The memory 42 contains all the software elements for producing data messages and for processing the encrypted data returned from each of the individual processing circuits. This data, i.e. essentially the data relating to the activated key is conveyed to the controlled machine 20 in encrypted form or in non-encrypted form depending on the implementation. It can be understood that the transfer of the electrical signals between the individual circuits and the driver unit is totally independent of the activated virtual key. Only the contents of the signal supplies this data but the signals are encrypted.

Figure 4:
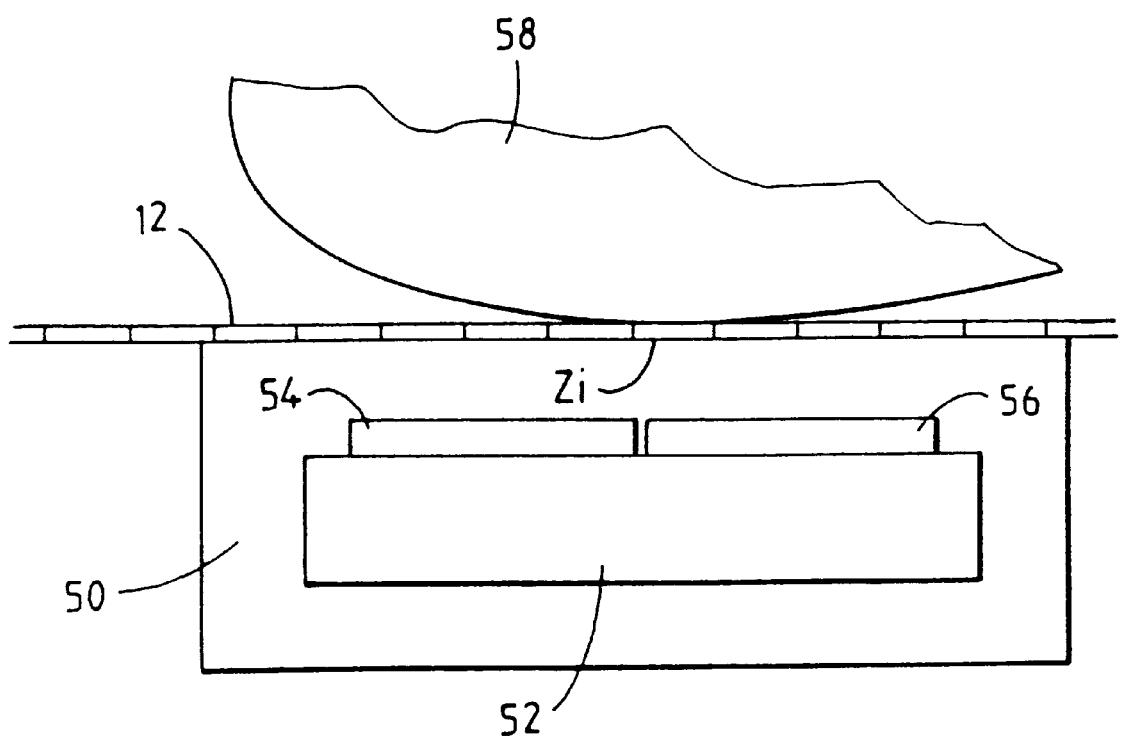
FIG. 4 is a simplified view in vertical section showing how an individual processing circuit and its associated sensor are implemented when said sensor is a capacitive sensor.

FIG. 4 is a view in vertical section showing how a virtual key and its associated individual processing circuit are implemented when the virtual key is of the capacitive type. This figure shows the front panel 12 of the keypad and the sensitive zone Zi on said panel. A package 50 is fixed to the panel, or more precisely to its rear face. The package contains firstly the semiconductor chip 52 in which the various electronic components of the individual processing circuit 14i are implemented, and secondly the component parts of the associated sensor. In this case, two electrodes forming the plates of a capacitor and respectively referenced 54 and 56 are implemented on the top face of the chip 52. The plates 54 and 56 are close enough to the front face of the package 12 to ensure that, when the user places a finger 58 facing the two electrodes, an analog signal is transmitted corresponding to activation of the virtual key in question.

It can be understood that, since the component parts of the activation sensor that are constituted by the conductive deposits 54 and 56 are directly deposited on the top face of the chip 52 including the components of the individual processing circuit, the structure is monolithic preventing fraudulent systems from being installed in attempts to detect the electrical signals in transit inside the package. Furthermore, the chip 52 also includes the interface circuit between the electronic circuits proper of the chip 52 and the buses for conveying the encrypted data produced by the individual processing circuits to the driver unit 18.

It can be understood that the keypad is protected by a combination of the following characteristics. Firstly, the unit constituted by the sensor associated with the sensitive zone and by the circuits of the individual processing circuit is monolithic and therefore makes it almost impossible to detect the electrical signals produced. Secondly, since each individual processing circuit periodically and cyclically receives an interrogation message, and responds by transmitting a reply indicating either that the corresponding key has been activated or that it has not been activated, and since the signals conveyed in the bus are encrypted, it is impossible, even by taking a large number of data readings, to associate an electrical signal with the identification of the activated key. To protect the system still further, the encryption key constituting one of the parameters of the encryption algorithms is preferably specific to each individual processing circuit. This makes it even more difficult for fraudulent action to be taken on the keypad.

In the preceding description, consideration is given to the case when the sensor associated with each sensitive zone is a capacitive sensor. Naturally, other types of sensors could be used. In particular an opto-electronic sensor could be used, the optically sensitive element being deposited on the top face of the semiconductor chip, the package of the circuit being provided with an optical window. An electromagnetic sensor of the damped oscillating circuit type could also be used. In which case the coil of the sensor is likewise implemented directly on or in the semiconductor chip in which the processing circuit is formed.

To improve the protection of the keypad still further, the front face 12 of the keypad may be made of a transparent material. In this way, any fraudulent conductors installed in the keypad to implement an eavesdropping matrix using capacitive detection would be seen.

I claim:

1. Protected keypad apparatus for entering data into a machine, said keypad including n sensitive zones, a detection sensor associated with each sensitive zone for detecting actuation of the associated sensitive zone, and a keypad driver unit for driving said keypad, said protected keypad apparatus being characterized in that it further includes:

n individual processing circuits (14i), and n sensors (24), each circuit being associated with a sensor, each unit comprised by an individual processing circuit and its associated sensor having a physically monolithic structure forming a protected key, each circuit being associated with a respective sensitive zone and including encryption means (22, 26, 28, 30) for encrypting detection or non-detection of activation of the associated sensitive zone; and electrical link means (16) for conveying data between said keypad driver unit (18) and each of said individual processing circuits;

said driver unit and said individual circuits including means for periodically causing encrypted data indicating activation or non-activation of each of said sensitive zones to be conveyed to the driver unit.

2. Keypad apparatus according to claim 1, characterized in that each of said sensors is a capacitive detector activated by the action of a finger on the corresponding sensitive zone.

3. Keypad apparatus according to claim 2, characterized in that each individual circuit (14i) is enclosed in a respective package (50), and in that the detection plates of the capacitor (54, 56) are formed directly on the semiconductor chip (52) in which the circuit is implemented.

4. Keypad apparatus according to claim 1, characterized in that each of said sensors is an opto-electrical detector activated by the presence of a finger on the associated sensitive zone.

5. Keypad apparatus according to claim 4, characterized in that each individual processing circuit is enclosed in a respective package provided with an optical window, and in that said opto-electrical detector is formed directly on the semiconductor chip in which the circuit is implemented.

6. Keypad apparatus according to claim 1, characterized in that said sensors are electromagnetic sensors.

7. Keypad apparatus according to claim 6, characterized in that each individual circuit (14i) is enclosed in a respective package and in that the electromagnetic detection coil is formed directly on the semiconductor chip in which the individual circuit is implemented.

8. Keypad apparatus according to any one of claims 1 to 7, characterized in that each individual processing circuit (14i) includes a microprocessor (22) receiving the detection signal, memory means (26, 28, 36) for storing encryption elements for encrypting the detection data, and for implementing an encryption algorithm, and means (32) for conveying the encrypted data produced by said microprocessor to the electrical link means (16).

9. Keypad apparatus according to any one of claims 1 to 7, characterized in that the driver unit comprises means for periodically and cyclically conveying an interrogation message to each individual processing circuit via the electrical communications means, and means for collecting the data encrypted by said individual circuits in response to the interrogation messages.

10. Keypad apparatus according to any one of claims 1 to 7, characterized in that each individual processing circuit stores its own specific encryption key.

11. Keypad apparatus according to any one of claims 1 to 7, characterized in that said protected keys constitute a matrix of keys which is included in a coating of transparent material whose top face is provided with said sensitive zones.

12. Keypad apparatus according to claim 8, characterized in that the driver unit comprises means for periodically and cyclically conveying an interrogation message to each individual processing circuit via the electrical communications means, and means for collecting the data encrypted by said individual circuits in response to the interrogation messages.

13. Keypad apparatus according to claim 8, characterized in that each individual processing circuit stores its own specific encryption key.

14. Keypad apparatus according to claim 9, characterized in that each individual processing circuit stores its own specific encryption key.

15. Keypad apparatus according to claim 8, characterized in that said protected keys constitute a matrix of keys which is included in a coating of transparent material whose top face is provided with said sensitive zone.

16. Keypad apparatus according to claim 9, characterized in that said protected keys constitute a matrix of keys which is included in a coating of transparent material whose top face is provided with said sensitive zone.

17. Keypad apparatus according to claim 10, characterized in that said protected keys constitute a matrix of keys which is included in a coating of transparent material whose top face is provided with said sensitive zone.

* * * * *